United States Patent [19]

Alexandrov et al.

[11] 4,037,805

[45] July 26, 1977

[54] ASSEMBLING AND REPAIR STATION OF A PLANT FOR PNEUMATIC TRANSPORTATION OF GOODS IN CONTAINERS THROUGH A PIPELINE

[76] Inventors: Adolf Moritsovich Alexandrov, Federativny prospekt, 6, korpus 3, kv. 8; Vladimir Efimovich Aglitsky, Zatsepsky val, 6/13, kv. 61; Ilya Solomonovich Kantor, Malo-Moskovskaya ulitsa, 31, kv. 45; Jury Abramovich Tsimbler, Sojuzny prospekt, 10, kv. 261; Jury Arnoldovich Topolyansky, Matveevskaya ulitsa, 10, korpus 4, kv. 442; Sergei Mikhailovich Susekov, shosse Entuziastov, 208, korpus 4, kv. 442, all of Moscow; Dmitry Rudolfovich Gun, Komsomolskaya ulitsa, 7, kv. 29, Ljubertsy Moskovskoi oblasti; Igor Igorievich Volyansky, proezd Stratonavtov, 12, korpus 1, kv. 12, Moscow; Gennady Alexeevich Pertsev, ulitsa Svoboda, 17, kv. 148, Moscow; Zoya Timofeevna Devyatkina, Teply Stan, 1 mikroraion, korpus 1, kv. 48, Moscow; Mark Abramovich Feldman, Yasny proezd, 14, kv. 100, Moscow, all of U.S.S.R.

[21] Appl. No.: 742,609

[22] Filed: Nov. 17, 1976

Related U.S. Application Data

[63] Continuation of Ser. No. 612,920, Sept. 12, 1975, abandoned.

[51] Int. Cl.² .......................................... B65G 51/04
[52] U.S. Cl. ................................... 243/38; 104/155; 243/1
[58] Field of Search ........... 243/1, 38; 104/48, 138 R, 104/155, 156

[56] References Cited

U.S. PATENT DOCUMENTS 3,762,665   10/1973   Alexandrov et al. .................. 243/38
3,885,757   5/1975    Alexandrov et al. .................. 243/38

Primary Examiner—Evon C. Blunk
Assistant Examiner—Jeffrey V. Nase
Attorney, Agent, or Firm—Fleit & Jacobson

[57] ABSTRACT

An assembling and repair station wherein the trough adapted to receive the containers is mounted on guideways extending perpendicularly to the center line of this trough. A plurality of troughs is arranged at both sides of the guideways, to accommodate the containers in the course of repair work. The troughs are arranged so that their center lines are parallel with the center line of the container-receiving trough and aligned coaxially therewith, when the container-receiving trough is brought into opposition to either one of the plurality of the container-accommodating troughs. The container-receiving trough is connected via a switch by one end thereof with a main pipeline, its other end being connected with a container-arresting device, the trough carrying a device for advancing a container therealong. The disclosed structure of the assembling and repair station increases its capacity.

7 Claims, 10 Drawing Figures

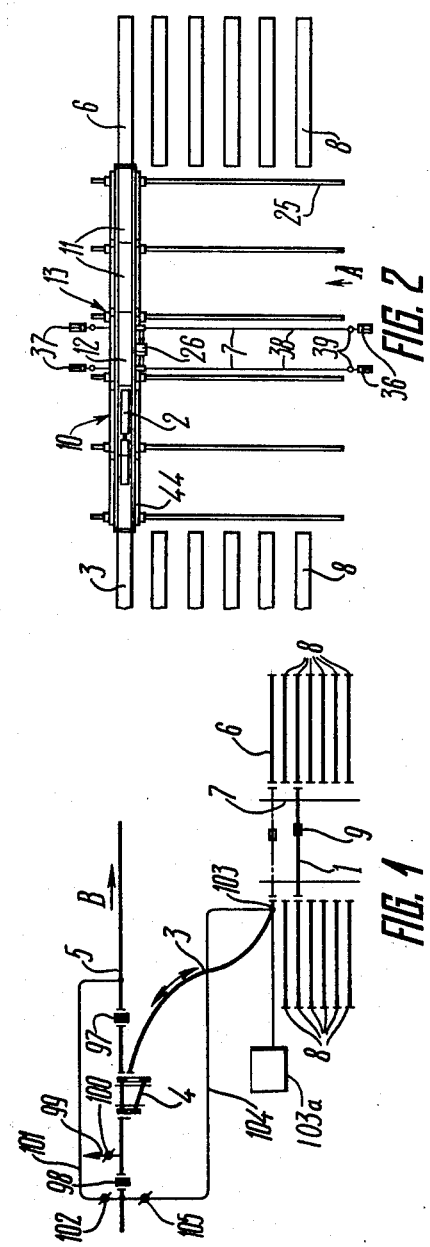

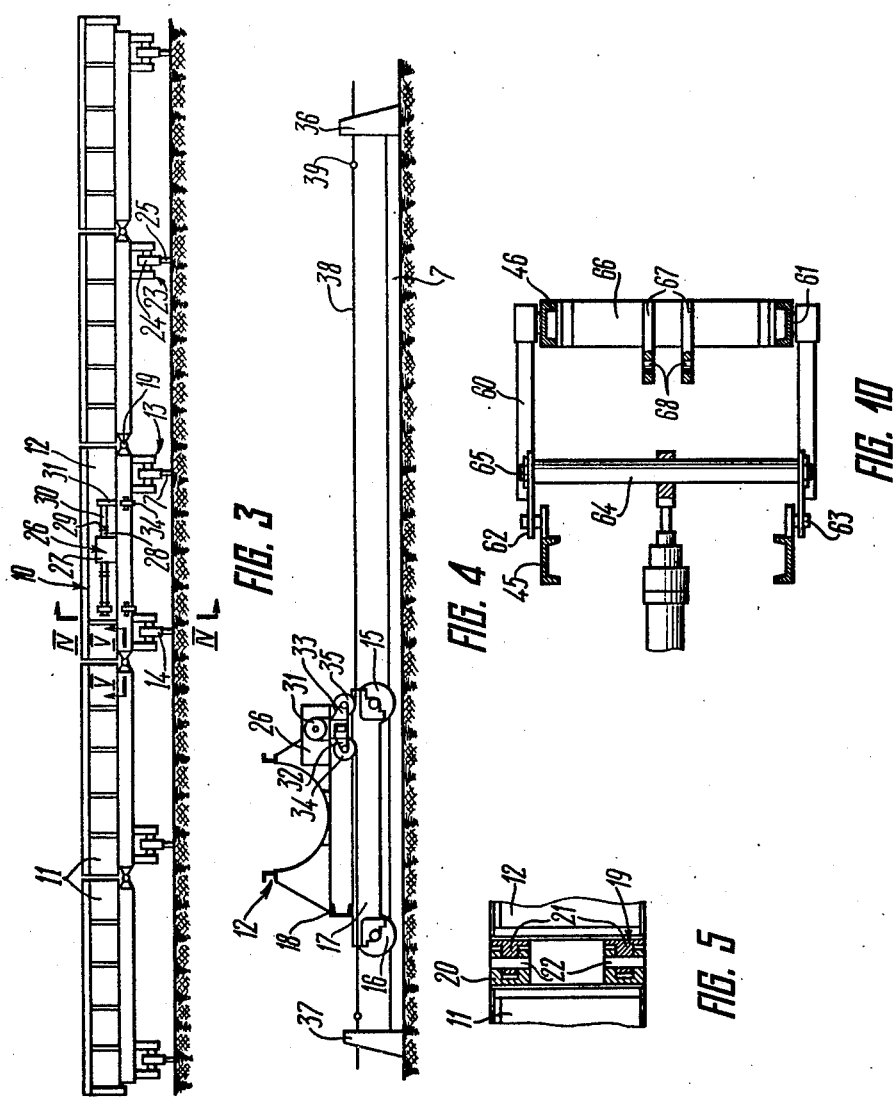

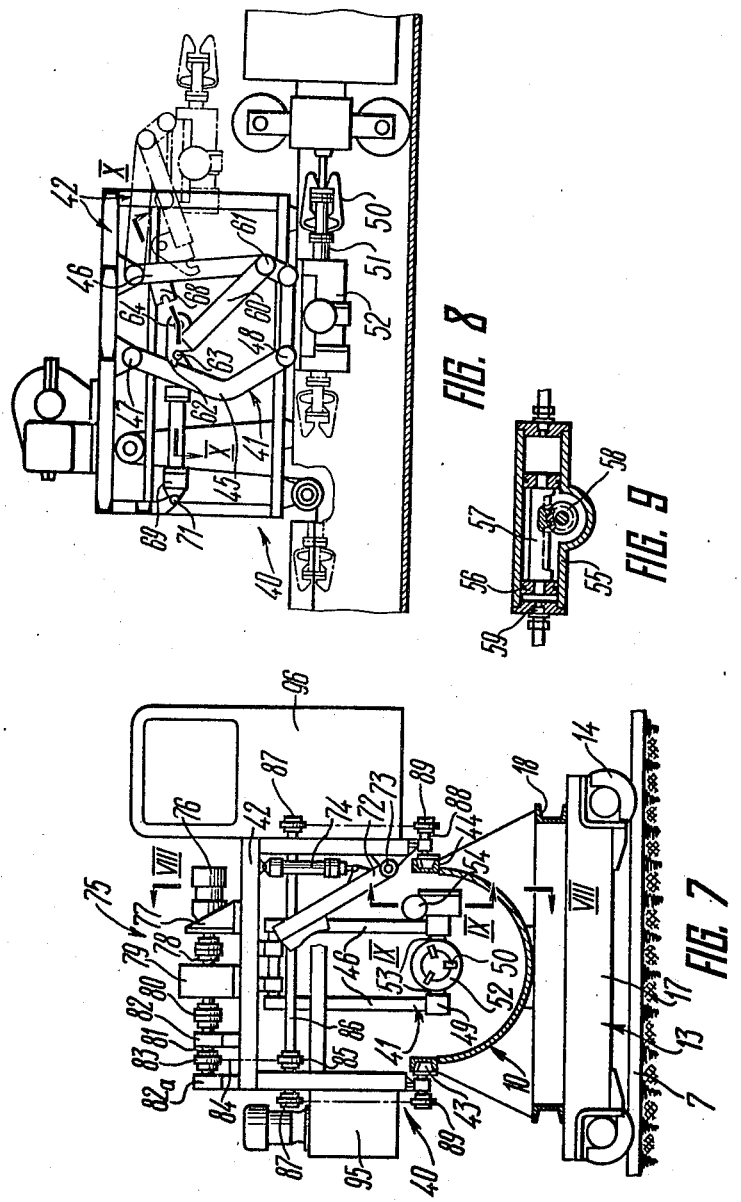

ASSEMBLING AND REPAIR STATION OF A PLANT FOR PNEUMATIC TRANSPORTATION OF GOODS IN CONTAINERS THROUGH A PIPELINE

This is a continuation of application Ser. No. 612,920, filed Sept. 12, 1975, now abandoned.

The present invention relates to plants for penumatic transportation of goods in containers through pipelines and, more particularly, it relates to assembling and repair stations of such plants.

An assembling and repair station constructed in accordance with the present invention can be employed to utmost effectiveness in plants having a relatively large stock of containers or trains of containers.

There are known assembling and repair stations of plants for pneumatic transportation of goods in containers through a pipeline, containing a trough for receiving containers therein, having one end thereof connected via a switch with the main pipeline through which the containers are advanced and the other end thereof connected with a container-arresting device. The container-arresting device is a blind-end length of a pipe, in which device a container enters to be arrested by the air being compressed in front of the container.

The known assembling and repair station has a device for moving containers along the container-receiving trough. The device includes a winch mounted at the end of the container-receiving trough. The drum of the winch has secured thereto one end of a cable of which the other end passes about a pulley mounted on the pipeline in front of the switch and can be secured to a container for moving the latter along the trough, to introduce the container via the switch into the pipeline, following an inspection and repair of the container (see, for example, the "Promyshlenny Transport" Magazine, No. 3,1972, Literature on Construction Publishing House, Moscow — the article titled "Pipeline's New Profession" on p. 14).

The assembling and repair stations of the abovespecified type are suitable for plants wherein a relatively small stock of containers is employed.

Considering the fact that as the technique of pneumatic transportation of goods in containers gains new grounds, the proportion of plants having pipelines of increased lengths and higher capacity with an increased amount of the containers circulated therethrough becomes ever greater. This results in the problem of marshalling and breaking up the considerable number of trains of containers and providing for routine inspection and repairs simultaneously of a considerable amount of containers.

However, the hitherto known assembling and repair stations have proved to be incapable of providing for such considerable amount of containers being inspected, subjected to maintenance and repairs and marshalled into trains.

It is an object of the present invention to create an assembling and repair station of a structure that should provide for a relatively high output capacity in the process of performing maintenance and repair work on containers and in marshalling the latter into trains.

With this and other objects in view, there is herein disclosed an assembling and repair station of a plant for the pneumatic transportation of goods in containers through a pipeline, having a container-receiving trough connectable at one end thereof with a pipeline through a switch, for receiving a container therein. The other end being connectable with a container-arresting device, and a device for advancing containers along this trough, in which station, in accordance with the invention, said trough for receiving containers therein is mounted to be reciprocated on guideways extending perpendicularly to the unter line of said trough. A plurality of troughs is provided for accommodating the containers in the course of their repair work being arranged at both sides of these guideways parallel to one another, the center lines of these container-accommodating troughs being also parallel with the center line of said container-receiving trough, and are aligned coaxially therewith when said container-receiving trough is brought into opposition to either one of said plurality of the container-accommodating troughs, the device for advancing the containers along said container-receiving trough being mounted on said trough for motion therealong.

It is expedient that said container-receiving trough should be made up longitudinally of a series of pivotally connected sections of which the central one is mounted on a trolley having two wheel pairs, each pair being made up of two rollers supported by a single guideway, each one of the side and endmost sections of the trough having the end thereof, remote from the central section, mounted on a trolley having one wheel pair supported by a respective guideway.

With the container-receiving trough having this structure, it can be used for receiving a train of containers having a relatively great length and weight, and that with the trough itself being of a relatively small weight, whereby the consumption of metal at the manufacture of the trough is reduced, the same as its production cost, the required capacity and the power consumption of the drive actuating the trough being likewise reduced.

It is also expedient that the drive which is adapted to move the the container-receiving trough along the guideways be mounted on the central section.

With the drive arranged in this way, the transmission of load from the side and endmost sections to the central one becomes more uniform. Furthermore, owing to the symmetry of the load with respect to the central driving section, better alignment of both ends of the container-receiving trough with the container-accommodating troughs is provided for.

Another feature of the present invention is the fact that the device for advancing the containers along the container-receiving trough includes a driven trolley having its roller wheels mounted in guideways provided on the external side surfaces of this trough, the frame being arranged above said trough so that the containers can pass thereunder, the device further including two pivoted four-link leverages arranged at the lateral sides of said frame, their links adapted for plane-parallel motion carrying a grip adapted for cooperation with a container, mounted on these links for rotation through 180°, while their links adapted for rocking motion are pivotally mounted on the respective sides of the frame and are rigidly connected with each other in the course of transportation of a container.

With the device for advancing the containers having the above described structure, the operations of marshalling a train of containers, of introducing the containers into the pipeline, as well as directing the containers into the respective container-accommodating troughs for inspection and maintenance are performed both more swiftly and more efficiently.

It is expedient that the abovementioned rigid connection between the links of the four-link leverages, adpated for rocking motion, should be effected through a pair of arms, each arm interconnecting the links of one four-link leverage, for which purpose the pivot pin of this arm is supported by one link, the opposite free end of the arm having made therein a slot engaging a stud secured on the other one of the interconnected links, there also being provided a pair of braces of which one interconnects the two arms and is connected, in its turn, with a power cylinder provided for actuation of the four-link leverages, the other brace interconnecting the links carrying the pivot pins of the pivotal arms, said other brace being adapted to accommodate therein the first-mentioned brace when the four-link leverages are brought into their initial topmost position.

The abovedescribed rigid connection between the links of the four-link leverages is structurally simple and reliable.

It is further expedient that the trolley should incorporate a device for driving the containers apart and bringing them together, including an arm having its pivot pin secured to the frame of the trolley and extending parallel with the center line of the trough, the arm being connected to a power cylinder provided for pivoting the arm transversely of the trough for driving the containers apart and bringing them together.

The abovedescribed device for driving the containers apart and bringing them together is structurally simple, convenient and reliable.

It is quite expedient to have a branch pipe mounted intermediate the switch and the end of the container-receiving trough, the end of this branch pipe adjoining the trough, having mounted thereon a gate valve to close its clear opening, said gate valve being associated with an actuator adapted to open this gate valve, to afford a passage for a container. Also, to provided a connection to a source of compressed air, and to feed compressed air into the pipeline selectively after a container has been introduced thereinto.

The incorporation of the branch pipe with an actuated gate valve at the end thereof and of the connection to a compressed air source enables one to locate the assembling and repair stations at any distance from the main pipeline, as well as to deflect individual containers and trains of containers from and to return them into the plant without interfering with the operation of the plant in an automatic mode.

An assembling and repair station of a plant for pneumatic transportation of goods in containers through a pipeline, constructed in accordance with the present invention, provides for performing maintenance and repair work simultaneously with a considerable number of containers, i.e., for arranging the routine of inspection, maintenance, repair of containers, marshalling them into trains, breaking up the trains of containers, and introducing either the trains or individual containers automatically into the pipeline.

Furthermore, the herein disclosed station is structurally simple and reliable in operation.

Other objects and advantages of the present invention will be made apparent from the following description of an embodiment of the invention, with reference being had to the accompanying set of drawings, wherein:

FIG. 1 schematically illustrates an assembling and repair station of a plant for pneumatic transportation of goods through a pipeline, in accordance with the invention;

FIG. 2 is a plan view of the container-receiving trough and of the plurality of the trough for accommodating the containers for their inspection and repairs;

FIG. 3 shows in more detail a view taken along arrow line A in FIG. 2;

FIG. 4 shows in more detail a sectional view taken on line IV—IV of FIG. 3;

FIG. 5 shows in more detail a sectional view taken on line V—V of FIG. 3;

FIG. 7 shows in more detail a sectional view taken on line VII—VII of FIG. 6;

FIG. 8 is a sectional view taken on line VIII—VIII of FIG. 7;

FIG. 9 shows in more detail a sectional view taken on line IX—IX of FIG. 7;

FIG. 10 is a sectional view taken on line X—X of FIG. 9.

Figure 6:
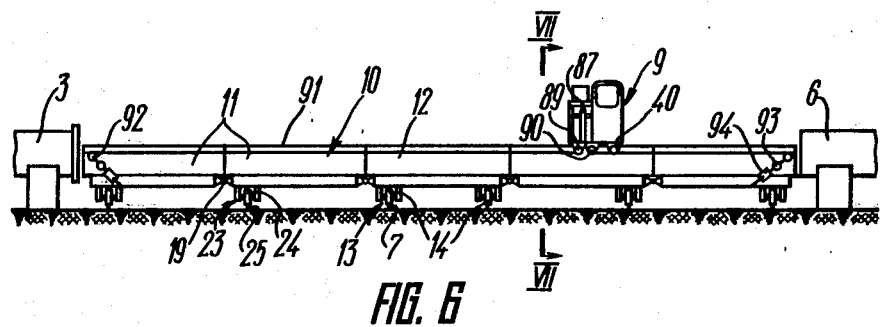
FIG. 6 shows the container-receiving trough with the device for advancing containers along the trough.

In the drawings, the assembling and repair station includes a trough 1 (FIG. 1) for receiving containers 2 (FIG. 2) therein, connectable by one end thereof in the course of receiving a container 2 via a branch pipe 3 (FIG. 1) and a switch 4 with the main pipeline 5 through which goods are transported in the containers 2 (FIG. 2) in operation of the plant. The other end of the trough 1 (FIG. 1) is connected with a container-arresting device 6 which is a blind-end length of a pipe.

However, the container-arresting device may be of any other known structure suitable for the purpose.

The container-receiving trough 1 is mounted on guideways 7 extending perpendicularly to the center line of the trough.

The trough 1 is mounted on these guideways 7 for reciprocation therealong by any appropriate means suitable for this purpose.

There is arranged at both sides of the guideways 7 a plurality of troughs 8 adapted to accommodate the containers therein for mainetanance and repair work. The troughs 8 are arranged parallel with one another so that their respective center lines are also parallel with the center line of the container-receiving trough 1.

As the trough 1 is reciprocated along the guideways 7, is can be coaxially aligned with either one of the plurality of the troughs 8 in which a container 2 to be inspected and repaired is to be accommodated.

The trough 1 has mounted thereon a device 9 for advancing the containers 2 along the trough.

The last-mentioned device is incorporated to advance a container into the branch pipe 3, as well as to advance the containers into the container-accommodating troughs 8.

In order to be able to receive a train of containers 2 (FIG. 2), the container-receiving trough 10 is made up longitudinally of several pivotally interconnected side sections 11 and the central one 12. The central section 12 is mounted on a trolley 13 having two wheel pairs 14 (FIG. 3) each being made up of roller wheels 15 and 16 (FIG. 4) supported by the same guideway 7. The roller wheels 15 and 16 are interconnected by a frame 17 supporting a frame 18 carrying thereon the section 12 of the trough 10.

The central section 12 is connected with the side sections 11 by means of pivots 19.

Each side section 11 is connected with the adjacent side section 11 by means of a similar pivot 19, each pivot 19 being made up by two brackets 20 (FIG. 5) and 21 received partly in one another and secured, respectively, on the adjoining end faces of the sections 12 and 11, or else 11 and 11.

The brackets have therein coaxially aligned through-going holes receiving therein a stud 22, which pivotally interconnects the two brackets.

Each side section 11 (FIG. 3) has the end thereof, remote from the central section 12, supported by a trolley 23 having one wheel pair 24. The last-mentioned wheel pair 24 is structurally similar to the abovedescribed wheel pairs 14. Each wheel pair 24 of the respective side section 11 is supported by its own guideway 25 which extends parallel to guideway 7.

The abovedescribed structure wherein the trough 10 is adapted to receive the containers 2, wherein each side section 11 is supported by the single guideway 25, enables one to have a relatively lightweight container-receiving trough of practically any length required for receiving a heavy train of containers 2.

To displace the trough 10 along guideways 7 and 25, the central section 12 carries a drive 26. The latter includes a hydraulic motor 27 of which the shafts 28 are connected via couplings 29 with shafts 30 having sprockets 31 secured on the ends thereof.

The frame 18 (FIG. 4) supports brackets 32 and 33 and carries respectively, sprockets 34 and 35. Extending parallel with guideway 7, there are tensioned between posts 36 and 37, the respective ones of traction chains 38 running in succession over the sprockets 35, 31, 34. The traction chains 38 are tensioned with a respective tension screws 39.

With the drive 26 being located on the central section 12 of the trough 10, the load in operation is more uniformly transmitted from the side sections 11 to the central one 12.

The device 9 (FIG. 6) for advancing the containers 2 along the container-receiving trough 10 includes a driven trolley 40 and two four-link leverages 41 (FIG. 7). The trolley 40 has a rigid frame 42 with rollers 43 rotatably supported thereby. The rollers 43 are supported in guideway 44 secured to the external side surfaces of the trough 10, while the frame 42 is rectangular in cross-section and positioned above the trough 10, for the containers 2 to unobstructedly pass thereunder.

The four-link leverages 41 are disposed at the lateral sides of the frame 42. Each four-link leverage 41 has a pair of links 45 (FIG. 8) and 46 which are adapted for a rocking motion, for which purpose each link has one end thereof hinged by means of a pivot 47 to the frame 42, the other end being pivotally connected by means of a pivot 48 with a link 49 adapted for a plane-parallel motion.

The links 49 of the four-link leverage 41 carry a grip 50 adapted to engage a container 2. The grip 50 is mounted on the piston rod 51 of a telescopic power cylinder, e.g., a hydraulic cylinder 52.

The telescopic hydraulic power cylinder 52 is mounted with the aid of journals 53 (FIG. 7) on the links 49 for rotation through 180° in a vertical plane. Another hydraulic cylinder 54 is provided to effect rotation of the hydraulic cylinder 52 with the grip 50.

The hydraulic cylinder 54 has a housing 55 (FIG. 9) receiving therein two pistons 56 interconnected by a rod 57 including a toothed rack meshing with a gear wheel 58 mounted on one of the journals 53. Connections 59 are mounted at the end faces of the housing 55 for selectively feeding the power liquid into the cylinder from either end.

With the grip 50 being rotatable through 180°, it becomes possible to advance the containers 2 either to the right in FIG. 8 or to the left, to forward them into the container-accommodating troughs 8 arranged at both sides of the guideway 7.

When the containers 2 are being advanced along the trough, the links 45 and 46 of the two four-link leverages 41 are rigidly interconnected. The rigid connection between the links 45, 46 of each four-link leverage 41 is effected with the aid of an arm 60 of which the pivot axis 61 is fast with the link 46. The opposite free end of the arm 60 carries a catch 62 with a slot engageable about a stud 63 fast with the link 45.

The arms 60 of the two four-link leverages 41 are interconnected by a brace 64 having its opposite ends secured in the respective catches 62 with aid of nuts 65 (FIG. 10). The links 46 of the two four-link leverages 41 are rigidly interconnected by another brace 66. The brace 66 has attached thereto brackets 67 having slots 68 adapted to accommodate therein the brace 64 when the four-link leverages 41 are brought into their topmost or initial position shown in FIG. 8 in fine lines.

To actuate the four-link leverages 41 from the initial position into the operative one and vice versa, there is provided a hydraulic power cylinder 69 (FIG. 10) having its rod 70 connected with the brace 64.

The hydraulic cylinder 69 is pivoted with aid of a pivot 71 (FIG. 8) on the frame 42 of the trolley 40.

The frame 42 of the trolley 40 carries a device for driving the containers 2 apart or bringing them together, the device including an arm 72 (FIG. 7) of which the pivot pin 73 is secured to the frame 42 and extends parallel with the center line of the trough 10. To retain the arm 72 in its topmost position and to lower it into a position whereat it extends transversely of the trough 10, there is provided a hydraulic power cylinder 74 having one its end pivoted to the frame 42 and the other end pivoted to the arm 72, one end being that of the piston rod and the other end being that of the cylinder per se.

To advance the trolley 40 along the trough 10, there is provided a drive 75 including a hydraulic motor 76 mounted on the frame 42 with aid of a bracket 77. The hydraulic motor 76 is connected via a coupling 78 to the input shaft of a reducer 79 of which the output shaft is connected via a coupling 80 to a shaft 81 journalled in brackets 82 and 82a affixed to the frame 42. The shaft 81 has secured thereto a sprocket wheel 83 operatively connected through a chain 84 with another sprocket wheel 85 fast on a shaft 86 journalled in the frame 42. The opposite ends of the shaft 86 extend beyond the confines of the frame 42 and have sprockets 87 secured thereto, the arbors 88 of the rollers 43 linkewise carrying thereon sprockets 89. Furthermore, sprockets 90 (FIG. 6) are journalled on the frame 42 in the vicinity of the sprockets 89.

Traction chains 91 are tensioned at both sides of the trough 10 and run over deflecting sprockets 92 mounted at the opposite ends of the trough 10. The ends of the traction chains 91 are secured to tensioning screws 93 which are threaded into brackets 94 mounted on the trough 10. The traction chains 91 successively run over the sprockets 89, 87 and 90.

The frame 42 of the trolley 40 supports thereon a pumping station 95 (FIG. 7) supplying the hydraulic power cylinders 52, 54, 69, 74 and the hydraulic motor 76.

An operator's cab 96 is mounted on the lateral side of the frame 42 of the trolley 40, in opposition to the pumping station 95.

The pipeline 5 (FIG. 1) has sluice gates 97 and 98 provided in front of and after the switch 4. The portion of the pipeline 5 defined intermediate the sluice gates 97 and 98 has an air outlet connection 99 mounted thereon, closeable with valve 100.

An air conduit 101 with a gate valve 102 is connected as a by-pass conduit to the pipeline 5 at points in front of sluice gate 98 and behind the sluice gate 97 in the direction indicated with an arrow line B.

At the end of the pipe 3 adjoining the trough 1 there is mounted an end gate 103 associated with an actuator 103a adapted to open the gate for the passage of the container 2. The actuator of the end gate 103 can be of any suitable known structure, e.g., electric, hydraulic, etc.

The branch pipe 3 is connected via an air conduit 104 with the pipeline 5. The air conduit 104 is connected to the branch pipe 3 next to the end gate 103 and is provided with a gate valve 105.

The herein disclosed assembling and repair station of a plant for pneumatic transportation of goods in containers through a pipeline operates, as follows.

To direct a train of containers 2 into the trough 1 of the assembling and repair station from the main pipeline 5, the switch 4 is operated into the position whereat it connects the pipeline 5 with the branch pipe 3. The sluice gate 98 is set open, while the sluice gate 97 and the valve 100 are closed. The valve 102 of the by-pass air conduit 101 is slightly open to provide for a continuity of the flow of compressed air through the pipeline 5 through which other containers are still being transported. The gate valve 105 of air conduit 104 is closed, while the end gate 103 of the branch pipe 3 is opened. The container-receiving trough 1 is coaxially aligned with the branch pipe 3 and with the container-arresting device 6.

The flow of compressed air sends the train of containers 2 from the pipeline 5 through the switch 4 into the branch pipe 3, wherefrom it passes into the container-receiving trough 1 and moves on by inertia to the container-arresting device 6. As the leading end of the train enters the blind-end length of the pipe of the device 6, the train is arrested by the counter-pressure of the air compressed in front of the train. Then the train of containers 2 is returned from the blind-end length of the pipe of the device 6 into the container-receiving trough 1 by the device 9 for advancing the containers 2 along the trough 1.

This is done by the grip 50 of the container-advancing device 9 being lowered into its lowermost position from the topmost one, by operating the hydraulic cylinder 69 from the pumping station 95 so that the cylinder 69 retracts its piston rod 70 and thus displaces the arm 60 with catch 62 engaging the stud 63 of each link 45. As the four-link leverage 41 is thus displaced by the action of the hydraulic cylinder 69 and under its own weight, it lowers into its lowermost operative position. When the catch 62 of each arm 60 engages the stud 63 of the respective link 45, the four-link leverage 41 become rigid structure.

Then the hydraulic motor 76 mounted on the frame 42 is actuated, the motor 76 transmitting a driving torque via the coupling 78 to the reducer 79, the latter, in its turn, transmitting the torque via the coupling 80 to the shaft 81 and the sprocket 83 secured on the shaft.

Through the endless chain 84 the rotation is transmitted to the sprocket 85, to the shaft 86 supporting the last-mentioned sprocket and to the sprockets 87 mounted on the ends of the shaft 86 projecting beyond the frame 42.

The rotating sprockets 87 are in engagement with the traction chains 91 of which the ends are secured at the opposite ends of the trough 10 in the brackets 94 by means of the tensioning screws 93. The traction chains 91 run in succession over the sprockets 89, 87 and 90, and the trolley 40 of the container-advancing device 9 moves along the trough 10 in guideway 44.

As the container-advancing device 9 moves along the trough 1 toward the blind-end pipe of the device 6, the grip 50 encounters the bumper of the container 2 and grips it. The container-advancing device 9 is then moved along the trough 10 in the direction from the blind-end pipe of the device 6 together with the train of the containers 2, so as to position this train properly in the trough 10.

Thereafter, the trough 10 together with the train of the containers 2 received therein is displaced along guideways 7 and 25 into alignment with the selected one of the plurality of the troughs 8, into which the train of the containers is to be positioned for maintenance and repair. This is accomplished by energizing the drive 26, its hydraulic motor 27 transmitting the driving torque via the shafts 28 and couplings 29 to the shafts 30, thus setting in rotation the sprockets 31 mounted on the shafts.

The traction chains 38 running over the sprockets 31 and the sprockets 34 and 35 mounted, respectively, in brackets 32 and 33, the ends of the chains 38 being secured in the brackets 36 and 37 and tensioned with the screw 39. The rotation of the sprockets 31 results in trolley 13 of the central section 12 and the trolleys 23 of the side sections of the container-receiving trough 10 rolling along the guideways 7 and 25 until the trough 10 aligns with the selected one of troughs 8.

Then, the trolley 40 of the device 9 is displaced by the hydraulic motor 76 and by the endless chain longitudinally of the trough 10 together with the containers 2 toward the trough 8 to place the containers in this trough.

To provide for introducing the containers 2 into the troughs 8 either to the right (in the drawing) or to the left, as case may be, the grip 50 is rotatable through 180° in the vertical plane.

This rotation of the grip 50 is effected by the hydraulic cylinder 54 into which the power liquid is supplied via the connection 59 from the respective one of its ends, the piston 56 with its rod 57 being thus displaced, rotating the gear wheel 58. The gear wheel 58 being fast with one of the journals 53 of the telescopic cylinder 52, the rotation of the gear wheel results in the telescopic hydraulic cylinder 52 with the grip 50 carried thereby being rotated accordingly through 180°.

With the containers 2 having been placed in the selected trough 8, the four-link leverage 41 with the grip 50 is set into its initial topmost position by the hydraulic cylinder 69. While moving from the cylinder 69, the piston rod 70 thereof displace the arms 60, the brace 64 entering the slot 69 in the bracket 67, whereafter the four-link leverages 41 start pivoting jointly with the hydraulic cylinder 52 and the grip 50 toward the topmost position.

Marshalling and breaking up of the train of the containers and bringing them together can be accomplished as follows.

Should it be necessary to break up the train of the containers 2, the arm 72 of the device for spreading the containers and bringing them together is pivoted by the hydraulic cylinder 74 into the position transversely of the trough 10 between a pair of the containers 2, the containers having been uncoupled in advance. With the device 9 being subsequently displaced toward the trough 8, the arm 72 bears against the containing 2 and pushes it along the trough 10 toward the trough 8. A train of containers is marshalled in a similar manner.

Following the necessary maintenance and repair work, the train of containers 2 is driven from trough 8 into trough 10 by the containers advancing device 9. This is done by setting the grip 50 of the container advancing device 9 to its lowermost operating position with the hydraulic cylinder 69 and then displacing the device 9 toward the train of the containers, whereby the grip 50 engages the bumper of the endmost container 2, whereafter the device 9 is operated to retract the train into the container-receiving trough 10.

With the train of the containers 2 positioned in the trough 10, the latter is driven along the guideways 7 and 25 until it aligns with the branch pipe 3. At this stage the end gate 103 is open.

The device 9 is operated to drive the train of the containers 2 into the branch pipe 3, whereafter the trough is retracted from the pipe 3, and the end of the latter is closed with the end gate 103.

Then the sluice gates 97 and 98 of the main pipeline 5 are closed, the gate 105 of the air conduit 104 is opened, the gate 100 of the air outlet connection 99 is likewise opened, and compressed air is fed via the air conduit 104 to advance the train of the containers 2 through the branch pipe 3 via the switch 4 into the main pipeline 5.

The leading end of the train of the containers 2 compresses the air in the pipeline 5 in front of the sluice gate 98, whereby the train smoothly stops in the pipeline 5, some quantity of the air escaping via the gate valve 100 of air outlet connection 99.

To propel the train of the containers 2 along the pipeline 5, the switch 4 is set to the position shown in FIG. 1, the gates 105 and 100 are closed, and the sluice gates 97 and 98 are opened, whereafter the gate 102 is closed. The action of the compressed air propels the train of the containers 2 through the pipeline 5 in the direction indicated with the arrow line B.

What we claim is:

1. An assembling and repair station of a plant for pneumatic transportation of goods in containers through a pipeline, comprising: a switch means having one end thereof connected with said pipeline; a container-receiving trough connectable for receiving the containers with the other end of said switch means; a device for arresting the containers, connectable for receiving the containers with the opposite end of said container-receiving trough; a device for advancing the containers along said container-receiving trough, mounted on said trough movably therealong; means for driving said container-advancing device longitudinally of said trough; guideways extending substantially perpendicularly to the center line of said container-receiving trough; said container-receiving trough being mounted on said guideways for reciprocation therealong; means for driving said trough along said guideways; a plurality of troughs adapted to accommodate therein the containers for their maintenance and repair, arranged at both sides of said guideways parallel with one another, so that the respective center lines thereof are parallel with the center line of said container-receiving trough and coaxially aligned therewith, as said container-receiving trough is brought into opposition to either one of said plurality of said container-accommodating troughs.

2. An assembling and repair station as claimed in claim 1, wherein said container-receiving trough is made up longitudinally of a series of pivotally connected sections, the central section being mounted on a trolley having two wheel pairs formed each by rollers supported by a single one of said guideways, each side section having one end thereof, remote from said central section, mounted on a trolley having a single wheel pair supported by a single one of said guideways.

3. An assembly and repair station as claimed in claim 2, wherein said means for driving said container-receiving trough along said guideways is mounted on said central section.

4. An assembling and repair station as claimed in claim 1, wherein said device for advancing the containers along said container-receiving trough includes a driven trolley in which rollers are supported on guideways provided on the external side surfaces of said container-receiving trough, a frame of the trolley being situated above said trough, so that the containers are able to pass thereunder, said device for advancing the container further including two pivotal four-link leverages arranged at the lateral sides of said frame, of which the links adapted for plane-parallel motion carry thereon a grip adapted to engage a container, mounted thereon for rotation through 180°, whereas the links adapted for rocking motion are pivotally mounted on the respective lateral sides of said frame and are rigidly interconnected in the course of the operation of advancing a container.

5. An assembling and repair station as claimed in claim 4, wherein the rigid interconnection of the rockable links of the four-link leverages is effected with air of two arms connecting each the rockable links of the respective one of said four-link leverages to each other, the pivot axis of this arm being supported by one of these links, and the opposite free end thereof having made therein a slot engageable with a stud mounted on the other one of said links, the interconnection further including two braces of which one interconnects said arms and is also connected with a power cylinder adapted to actuate said four-link leverages, the other brace interconnecting the links supporting the pivot axes of said arms and being adapted to accommodate therein said first-mentioned brace, as said four-link leverages are brought into their initial topmost position.

6. An assembling and repair station as claimed in claim 4, wherein said trolley has mounted thereon a device for driving the containers apart and toward one another, including an arm of which the pivot axis is supported by said frame of said trolley and extends parallel with the center line of said trough, said arm being connected with a power cylinder adapted to rotate said arm into a position transversely of said container-receiving trough, to perform the operation of either driving the containers apart or toward one another.

7. An assembling and repair station as claimed in claim 1, wherein there is mounted intermediate said switch means and the adjacent end of said container-receiving trough a branch pipe of which the end adjoining said trough has mounted thereon a gate adapted to close off the flow passage area of said branch pipe, associated with an actuator and adapted to open said branch pipe to allow for the passage of a container, a connection being provided for communication with a source of compressed air and for supplying compressed air into said branch pipe after a container has been advanced thereinto.

* * * * *